(No Model.)  7 Sheets—Sheet 1.

J. W. MEAKER.
OPERATING DEVICE FOR FARE REGISTERS.

No. 564,252.  Patented July 21, 1896.

Witnesses:  Inventor:
  John W. Meaker
  by Bond, Adams, Pickard & Jackson
  his Attys

THE NORRIS PETERS CO., PHOTO-LITHO., WASHINGTON, D. C.

(No Model.) 7 Sheets—Sheet 2.

J. W. MEAKER.
OPERATING DEVICE FOR FARE REGISTERS.

No. 564,252. Patented July 21, 1896.

Witnesses:

Inventor:
John W. Meaker
by Bond, Adams, Pickard & Jackson
his Atty's (No Model.) 7 Sheets—Sheet 3.

J. W. MEAKER.
OPERATING DEVICE FOR FARE REGISTERS.

No. 564,252. Patented July 21, 1896.

(No Model.) 7 Sheets—Sheet 5.

J. W. MEAKER.
OPERATING DEVICE FOR FARE REGISTERS.

No. 564,252. Patented July 21, 1896.

Witnesses:
Inventor:
John W. Meaker

THE NORRIS PETERS CO., PHOTO-LITHO., WASHINGTON, D. C.

(No Model.)　　　　　　　　　　　　　　　　　　　7 Sheets—Sheet 7.
J. W. MEAKER.
OPERATING DEVICE FOR FARE REGISTERS.

No. 564,252.　　　　　　　　　　　　Patented July 21, 1896.

UNITED STATES PATENT OFFICE.

JOHN W. MEAKER, OF CHICAGO, ILLINOIS, ASSIGNOR TO THE MEAKER MANUFACTURING COMPANY, OF SAME PLACE.

OPERATING DEVICE FOR FARE-REGISTERS.

SPECIFICATION forming part of Letters Patent No. 564,252, dated July 21, 1896.

Application filed April 17, 1893. Serial No. 470,671. (No model.)

*To all whom it may concern:*

Be it known that I, JOHN W. MEAKER, a citizen of the United States, residing in Chicago, in the county of Cook and State of Illinois, have invented certain new and useful Improvements in Operating Devices for Fare-Registers, of which the following is a specification, reference being had to the accompanying drawings, which form a part of this specification.

Stationary fare-registers of cars are secured in position at one end of the car interior and are commonly operated by a cord or strap extending the length of the car in reach of the conductor wherever he may be at the time of receiving a fare to be registered, such cord being usually placed above the rope that is connected with the signaling-bell. In some cases a rigid polygonal rod has been arranged lengthwise of the car, back of the strap-rail, and so coupled with the register that the conductor may operate the register by giving a partial rotation to said rod by means of a lever carried on his person. In another instance an oscillatory rod, similarly situated, has been provided with fixed radial arms or hand-levers by which it could be operated for the same purpose. All these devices are objectionable. Besides that they are all unsightly in their exposed positions, the cord is open to the especial objection that it is often mistaken by passengers for the bell-cord, and the register is thus sometimes operated by the passenger and when no corresponding fare has been taken. The polygonal rod is especially objectionable because of the necessity of employing a separate lever or implement for its operation, while the rod having fixed arms thereon is open to the objection that the bell-cord is liable to catch in said arms, with the result of impeding the operation of one or the other. The last-mentioned device is, moreover, especially subject to accidental operation by passengers and is, besides, liable to interfere with or to be impeded by a standing passenger coming in contact with a fixed hand-lever thereon when it is being operated by the conductor. By the present invention I propose to obviate these faults in prior constructions and to provide a neat, convenient, and effective means for operating such registers.

In my invention a rod is employed as the medium for operating the register, and one of my improvements consists in an improved construction for making the strap-rail and said register-operating rod coincident, or practically so, the better embodiment of this feature of the invention consisting in making the strap-rail hollow and placing the operating-rod within it.

Another of my improvements consists in making the operating-rod in connected parts or sections; still another in locating the hand-levers for operating said rod at the brackets or hangers by which it and the strap-rail are supported, and still another in a suitable construction by which only that hand-lever which is operated by the conductor has movement with the operating-rod.

The invention embraces other improvements which will be made apparent in the following description, and, with the foregoing, set forth in the appended claims.

In the accompanying drawings, Figures 1 to 11, inclusive, together show a complete embodiment of the invention, embracing all my said improvements in one practical form thereof. Figs. 12, 13, and 14 are modifications in the construction of the hand-lever, and the remaining figures illustrate other modifications.

Fig. 12 is an enlarged detail showing a modified form and arrangement of the operating-lever. Fig. 13 is a similar view showing another modification of said lever.

Figure 1:
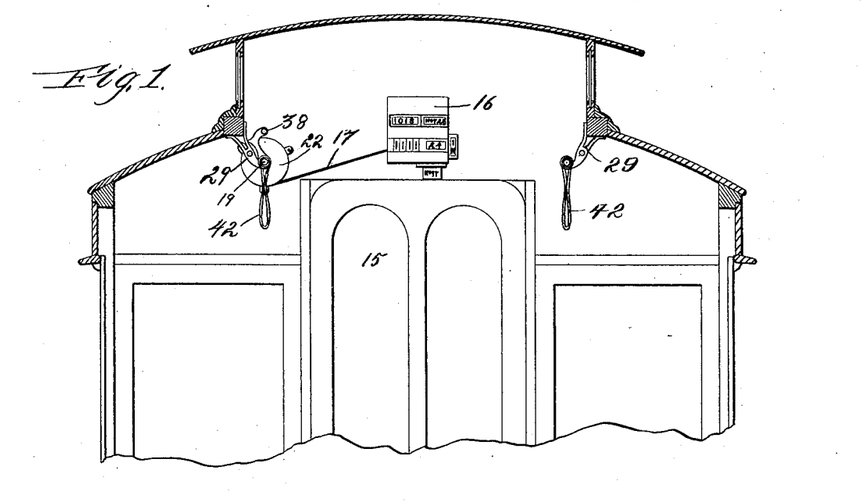
Fig. 1 is a vertical cross-section of a portion of a car, showing a fare-register and a portion of an operating mechanism containing my invention.
Figure 2:
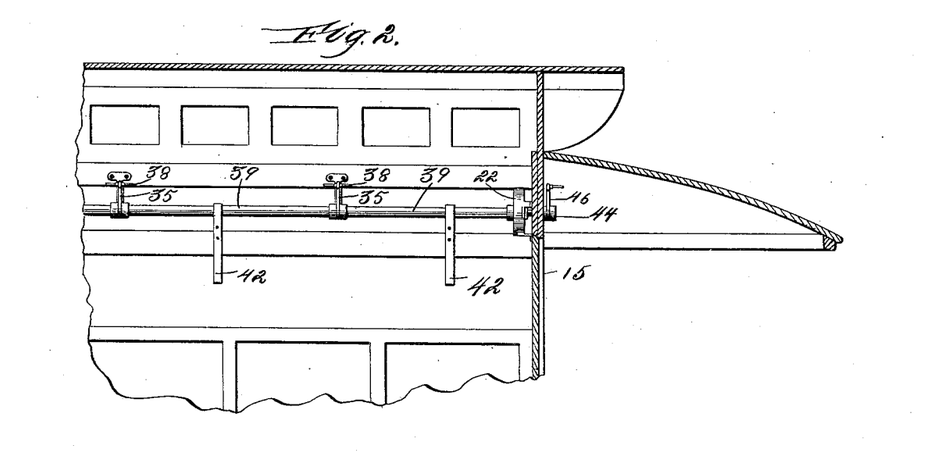
Fig. 2 is a longitudinal vertical section of a portion of the car, showing the operating mechanism in side elevation.
Figure 5:
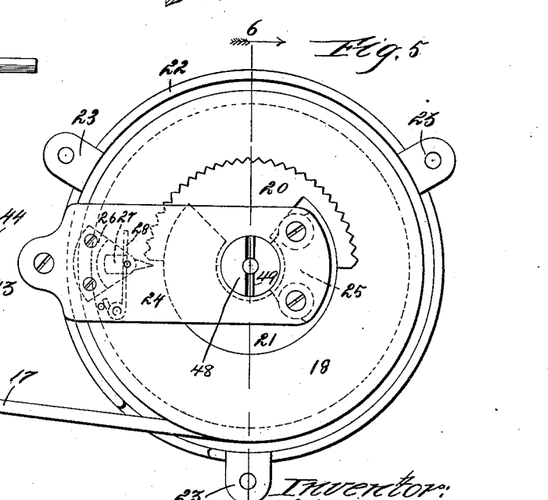
Fig. 5 is a back view of the pulley of the operating mechanism, said pulley having a full-motion-compelling device applied thereto.
Figure 6:
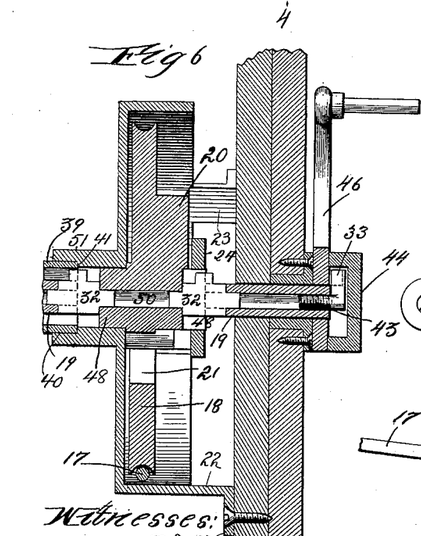
Fig. 6 is a sectional view on the line 6 6 of Fig. 5.

First describing the construction set forth in Figs. 1 to 11, inclusive, 15, Figs. 1 and 2, indicates a car, and 16 a fare-register affixed to the inside of one end of the car. The register may be of any suitable form, though it is preferably of the kind shown, which is that set forth in my prior patent, No. 454,370. This particular register is adapted to be operated by means of a pulling-strap 17, attached at one end to the movable mechanism of the register and connected at its other end with the periphery of an external pulley 18, Figs. 5 and 6, that is placed at one side of the register and is coupled with the operating-rod. This pulley, as here shown, is provided upon one of its side faces with a peripherally-notched concentric segment 20 for coöperation with a full-motion-compelling pawl or dog 27, Fig. 5, and it also has a segmental or parti-circular slot 21, the ends of which form shoulders for coaction with a stationary stop or bumper 25, Fig. 5, to limit the range of oscillation of said pulley, as set forth in my prior patent, No. 480,732. The pulley 18 is also shown as being inclosed within or covered by a case 22, which is attached to the end of the car by means of screws passing through ears 23 on the margins of said case, and the pawl 27 and the stop 25 are supported in proper relation to the peripherally-notched segment and the segmental slot upon a transverse plate or bar 24, arranged back of the case 22, as indicated in Figs. 5 and 6.

The dog mechanism 27 for engagement with the notched segment 20 is similar in construction and operation to that set forth in another prior patent granted to me, to wit, No. 478,167. In this mechanism, 26 is a triangular block secured to the supporting-plate 24, and in a slot or recess of which is pivoted the pointed pawl or dog 27, having its point arranged in position to be struck by the ends of the segment 20 to tilt it into an inclined position, the point of the pawl striking into the successive notches of said segment as the pulley is rotated. The pawl 27 is held with its point normally directed toward the center of the pulley by a spring 28, which yields as the pawl is inclined by contact with the segment, but immediately throws the pawl into its radial position with reference to the pulley when the segment has passed it. While this is a desirable form of device for compelling the full required movement of the pulley, and therefore of the register, any other suitable form of stroke-compelling mechanism may be substituted in its place. The stop 25, secured to the plate 24, may desirably be a block of rubber, as set forth in my said former patent, No. 480,732.

The operating-rod 19 extends the length of the interior of the car, and preferably protrudes through the ends of the car, so as to be operable from either platform. It is shown in the construction now being described as being made in sections appropriately coupled together and as being mounted rotatively within the strap-rail 39, which is shown to be tubular to accommodate the operating-rod in this position.

29 29 are brackets attached to the car-roof for the support or suspension of the said strap-rail, said brackets being arranged at the usual or any suitable distance apart for this purpose. In the construction now being described said tubular strap-rail is also made sectional or in lengths, each extending from one bracket to the next, the ends of the several sections of the strap-rail being connected to the brackets. For this purpose the brackets may have the construction indicated in Fig. 8, wherein 30 is a hub provided with a recess 40 on each side to receive an end of the strap-rail, said recess terminating in a shoulder 41, against which the said section of the strap-rail abuts. As here shown, the hub 30 has a central through-passage 31, which is of proper size to admit the operating-rod 19, so as to afford support for the latter while permitting its rotation. The hub has also a transverse slot 34, in which is fitted the end of the hand-lever 35, said hand-lever having also a central opening in which the operating-rod loosely fits. As a means of imparting rotary motion to the operating-rod 19 by vibration of the lever 35, the latter is provided with a lateral projection 36, as shown in Fig. 9, and the operating-rod with a projection 33.

The projection 36 on the hand-lever being arranged back of the projection 33 upon the operating-rod, it is evident that while a movement of the hand-lever outward and downward, in the construction here shown, will correspondingly rotate the operating-rod, the rod may be rotated by any one hand-lever without imparting motion to the others. The projection 33 on the operating-rod 19 is illustrated in this construction as being formed upon a coupling-piece which unites adjacent sections of said operating-rod within the hub of the bracket. As here shown, the operating-rod is tubular and its sections are provided at their abutting ends with longitudinal coincident slots, as indicated in Figs. 8, 10, and 11.

Figures 7, 8, 9, 10, 11:
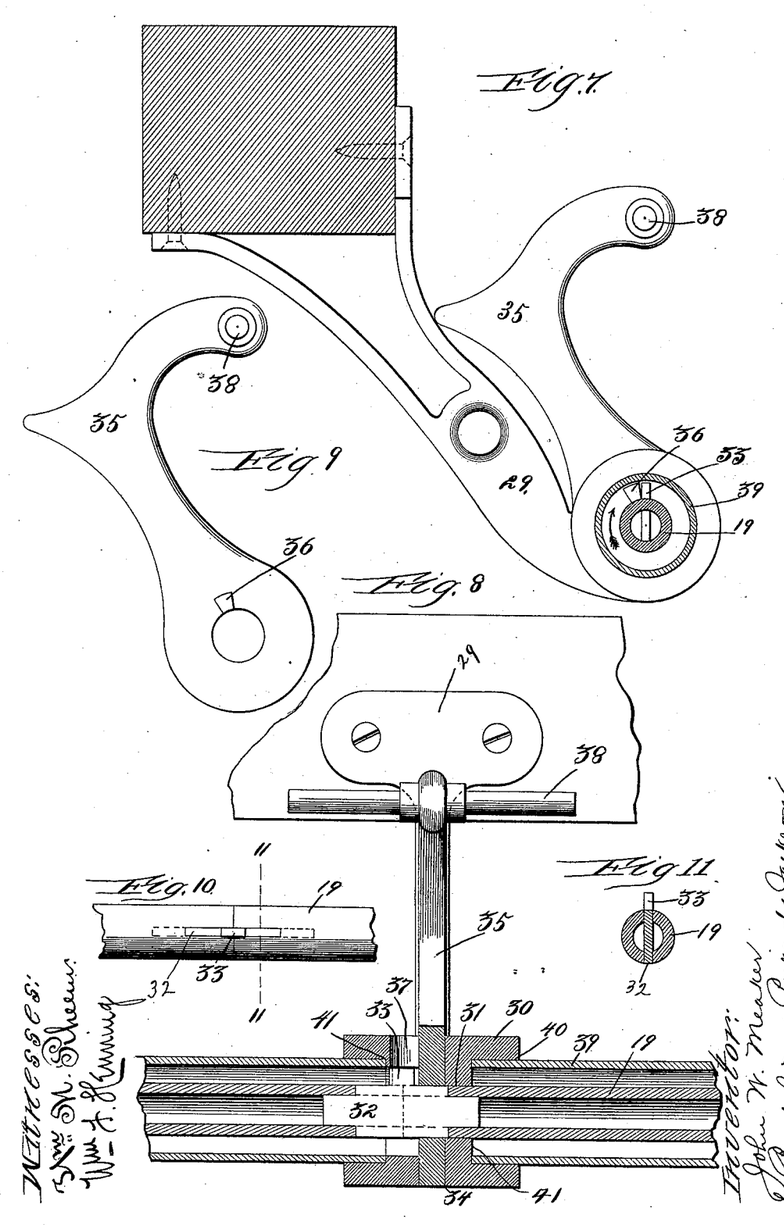
Fig. 7 is an enlarged detail, being a vertical cross-section of the operating-shaft and inclosing tubular strap-rail and showing the bracket for supporting the strap-rail and one of the operating-levers of my invention in elevation.
Fig. 8 is an enlarged detail, being a longitudinal vertical section of the operating-shaft, inclosing tubular strap-rail, and operating-lever.
Fig. 9 is a side elevation of one of the operating-levers detached.
Fig. 10 is a top or plan view of the operating-shaft, showing one form of joint for uniting the sections thereof when made in parts.
Fig. 11 is a sectional view on the line 11 11 of Fig. 10.

32 is a flat metal plate occupying these slots and also having end projections, which enter the tubular rod-sections beyond the slots, as clearly indicated in Figs. 8 and 10, this construction serving to hold the adjacent sections of the operating-rod in alinement without the provision of more than one support 31 therefor. This splice-plate 32 is provided with the lateral projection 33 for engagement with the lug 36 upon the hand-lever. To enable the hand-lever to be inserted in the transverse slot 34 in the bracket, the hub of the latter is provided with an opening 37 for the passage of the lug 36.

While the engagement of the operating-rod with the pulley 18 may be of any simple and ordinary form, I have chosen in this construction to make such engagement through the medium of coupling-plates 32, connecting it with the adjacent section of said rod within the car and with a short section of the rod which projects through the end of the car, as shown in Fig. 6. To this end I have provided the pulley with opposite trunnions 48, one of which rotates in a hub 51 of the case 22, and the other in the back plate 24, said trunnions having slots 49, Figs. 5 and 6, to receive the ends of the said coupling-plates 32, the opposite ends of said plates entering the slots in the adjacent rod-sections, as in the connection hereinbefore described.

In Fig. 6 it will be seen that the coupling-plates 32 are identical in form with those employed at the several brackets, and the pulley is provided with a central orifice 50, equal in size to that of the tubular operating-rod, to receive the extremities of said plates 32. Of course plates of other form adapted to fill the slots 49 may be employed, in which case no orifice 50 will be required.

Figure 3:
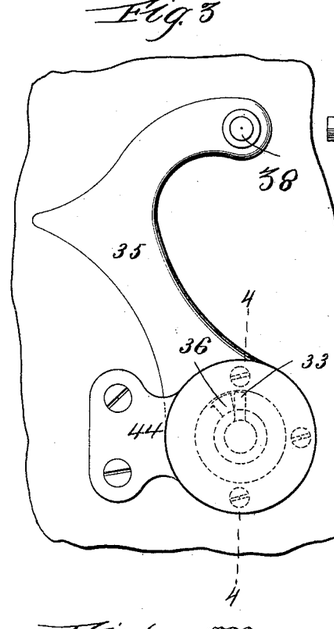
Fig. 3 is an enlarged detail, being an end view of that portion of the operating mechanism external to the end of the car.
Figure 4:
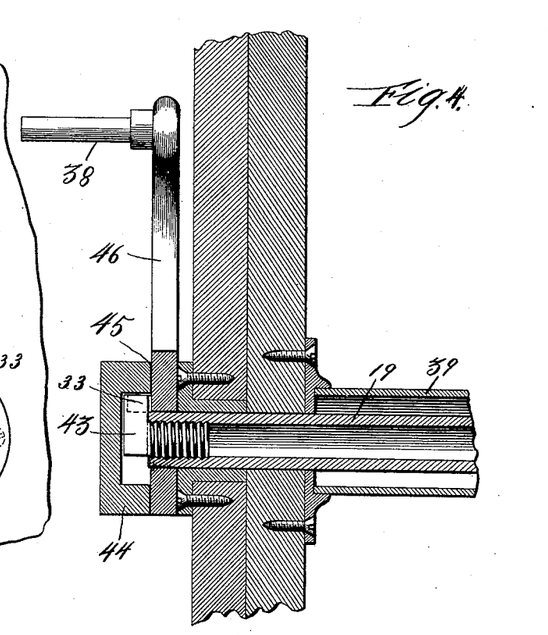
Fig. 4 is a vertical section on the line 4 4 of Fig. 3.

For the support of the adjacent section of the strap-rail the hub 51 on the pulley-case has the recess 40 and shoulder 41, described as present in the brackets, to respectively receive and engage the strap-rod section inserted in said hub. The short section of the rod 19, which extends through the end of the car, (seen in section in Fig. 6,) and the opposite end of the rod, projecting through the opposite end of the car, (seen in section in Fig. 4,) has a hand-lever 46 mounted on its outer end, said lever being provided with the already-described lug 36. The said short section of rod is also provided with a projection 33 for engagement with said lug, said projection 33 being in this case the laterally-elongated head of a screw-plug 43, which is screwed into the end of the rod-section until the said head bears firmly against the end thereof, the thread of the screw being right or left handed, as the case may be, to prevent the plug or its projection 33 from further turning under engagement of a hand-lever therewith. The terminal sections of the operating-rod 19 are held endwise in place by caps 44, secured to the surface of the car end, as, for example, shown in Fig. 3.

Figure 12:
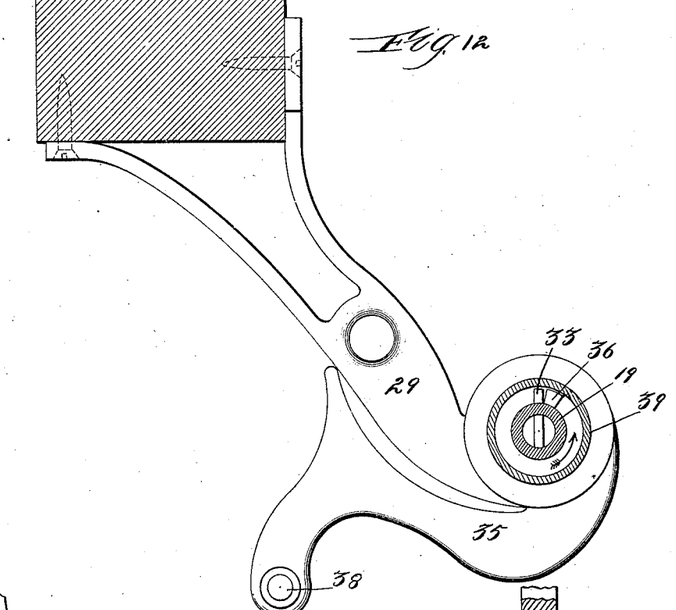
Figure 13:
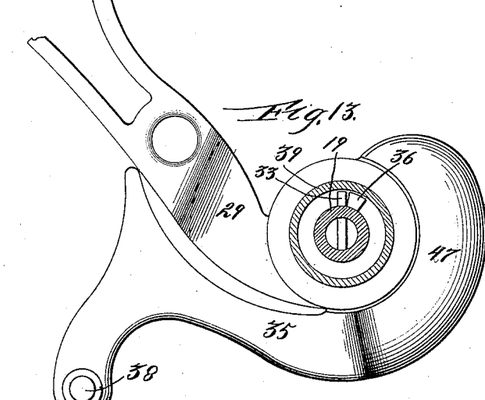
Figure 14:
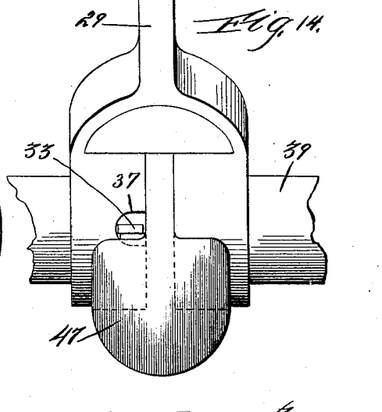
Fig. 14 is a front view of the form of device shown in Fig. 13.

Fig. 12 illustrates an arrangement of the hand-lever beneath the bracket instead of above it, so as to require a downward and inward movement to operate the rod 19. In Figs. 13 and 14 the same arrangement of the hand-lever is shown as in Fig. 12, with the addition of a weight 47 to the hand-lever, whereby such of said levers as are not being operated will be held in their retracted positions while the rod is being oscillated.

Figures 16, 17, 18, 19, 20:
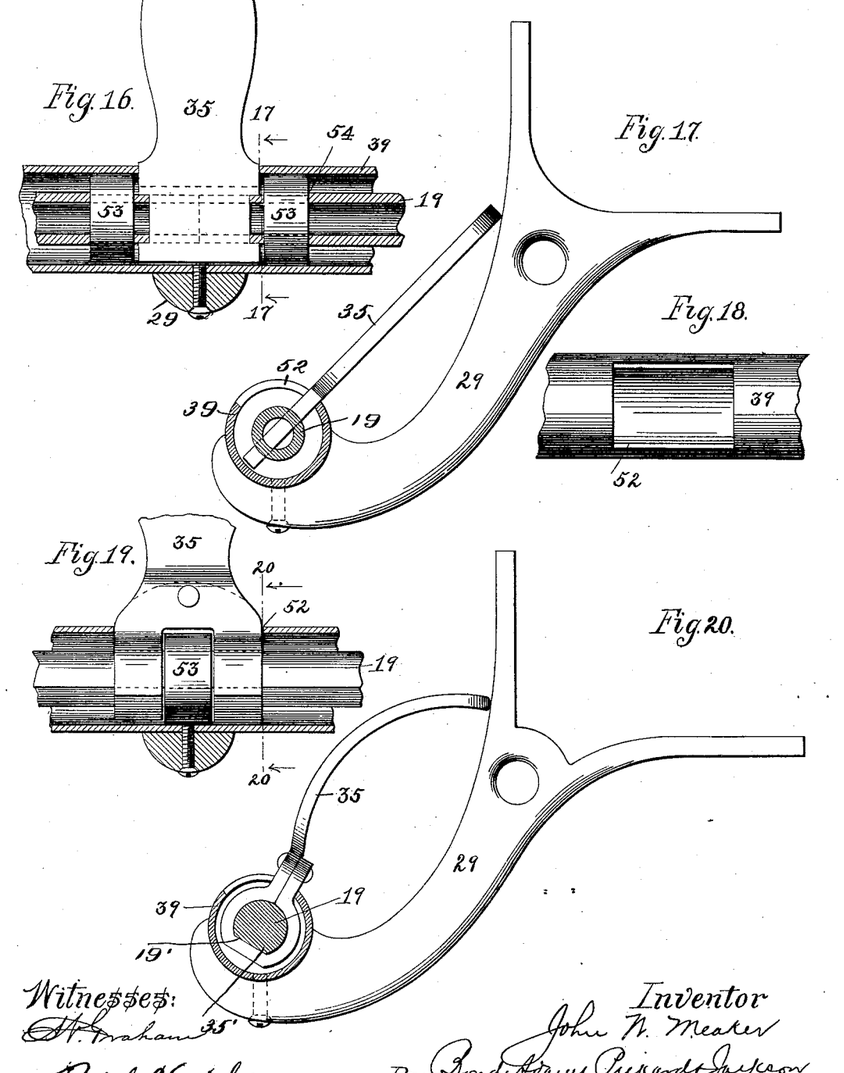
Fig. 16 is a longitudinal section of a continuous tubular strap-rail and a sectional rotative operating-rod.
Fig. 17 is a transverse section of the strap-rail and rod in the line 17 17 of Fig. 16, showing a bracket in side elevation.
Fig. 18 is a top view of a portion of the strap-rail of Figs. 16 and 17.
Fig. 19 is a longitudinal section of a continuous strap-rail, showing a continuous operating-rod in side elevation, with a portion of the operating-lever.
Fig. 20 is a transverse section of the strap-rail and operating-rod in the line 20 20 of Fig. 19.

In Figs. 16, 17, and 18 is illustrated a construction in which the strap-rail 39 is continuous and the operating-rod 19 is composed of parts or sections. In this case the strap-rail may be attached to the brackets 29 in the customary manner. (Illustrated in Fig. 17.) The hand-lever 35 is here shown as formed of a flat plate, which also serves as the splice-piece for joining the sections of the operating-rod, the latter being provided with longitudinal slots in their ends to receive it, as already described, and as indicated in Fig. 17. In this construction the continuous strap-rail 39 is provided with an opening 52 to admit the hand-lever 35 and allow its required vibratory movement. Also in this construction the adjacent ends of the parts of the operating-rod are centrally supported within the tubular strap-rail by bearing rollers or supports 53, which embrace said parts of the rod near the hand-lever. These may be tight within the strap-rail, permitting the rod to rotate within them, or they may be tight upon the rod and rotate within the strap-rail, or they may be loose as to both of these parts and held in place by shoulders 54 on the rod-sections.

In the construction indicated in Figs. 19 and 20 both the strap-rail and the operating-rod are continuous, the hand-lever 35 being bifurcated where it embraces the operating-rod and confining the supporting roller or sleeve 53 between its arms. While the hand-lever may have the form of engagement with the operating-rod which is set forth in the first construction described, it is shown as having rigid connection therewith by the provision of a flat side 19' on the operating-rod and a corresponding form of socket or aperture 35' in the operating-lever.

Figure 21:
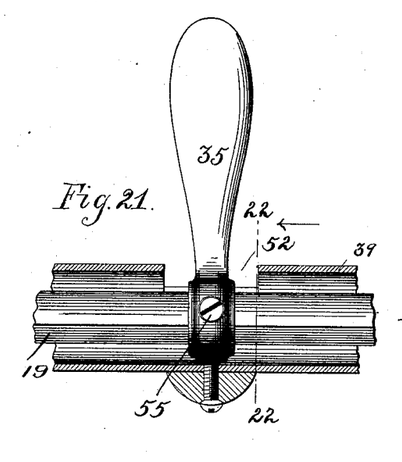
Fig. 21 is a longitudinal section of a continuous strap-rail containing a continuous operating-rod, seen in side elevation, and showing a hand-lever which forms a support for the rotative operating-rod within the strap-rail.
Figure 22:
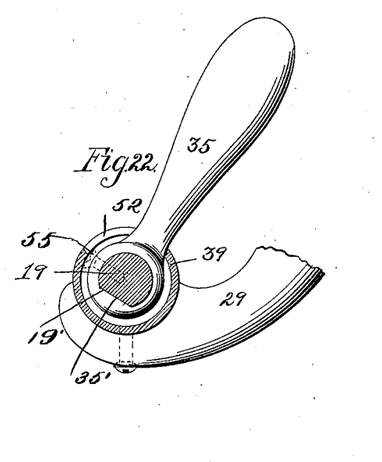
Fig. 22 is a transverse section in the line 22 22 of Fig. 21.

In the construction shown in Figs. 21 and 22 the hand-lever is adapted to form the support for the operating-rod, being of such rounded shape in the circular portion thereof within the strap-rail as to allow it to be turned within the latter into a transverse position after being inserted, with its sides lengthwise of said strap-rail, through the opening 52 of the latter. While this hand-lever may also have engagement with the operating-rod in the manner described in connection with the first construction set forth, it is here shown as having a flat-sided socket 35' corresponding with the flat-sided operating-rod 19. A screw 55 may be employed to hold the lever in place on the rod, or it may serve as the means for rotating the rod with the lever.

Figure 23:
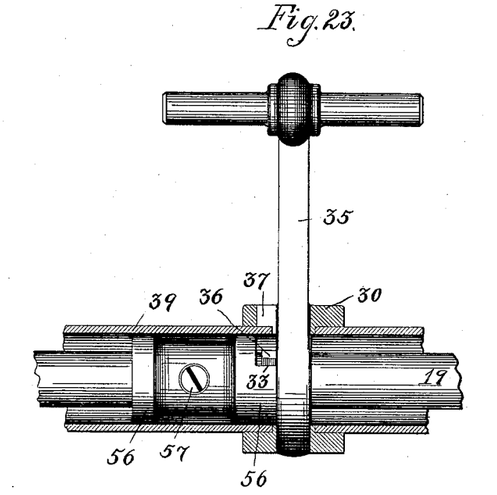
Fig. 23 is a longitudinal section of a strap-rail made in lengths joined at the brackets, containing a continuous operating-rod.
Figure 24:
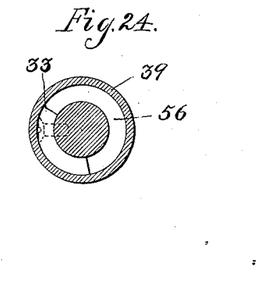
Fig. 24 is an end view of the shouldered bearing roller or sleeve seen in side view in Fig. 23.
Figure 28:
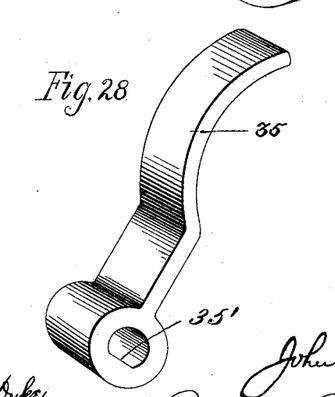
Fig. 28 is a perspective of a hand-lever detached.

Figs. 23 and 24 illustrate a construction in which the strap-rail is in tubular sections and the contained operating-rod is continuous. Here the hand-lever 35 is shown as having the lateral projection 36 for engagement with the projection 33 on the operating-rod, and the hub 30 has its opening 37 (which admits the projection 36 of the hand-lever) closed almost entirely by the adjacent section of the strap-rail 39, which, for this purpose, is let into the hub to a greater distance than shown in Fig. 8. In these Figs. 23 and 24, moreover, the projection 33 on the operating-rod is in the form of a shoulder upon a supporting-sleeve 56, rigidly secured to the operating-rod, as, for example, by a screw 57.

Figures 15, 25, 26, 27:
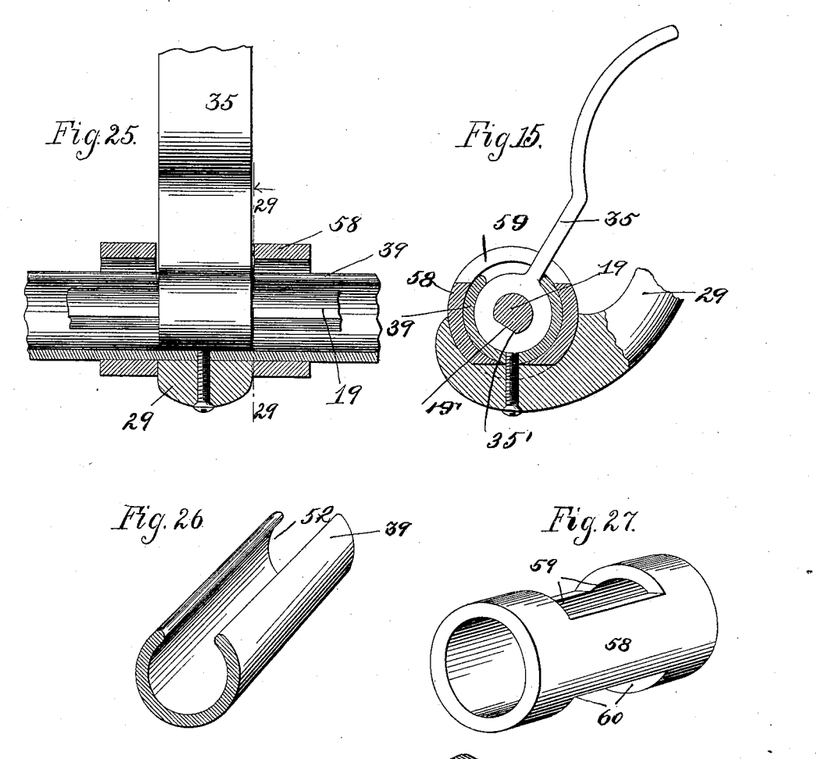
Fig. 15 is a transverse section of strap-rail and operating-rod, on the line 29 29 of Fig. 25.
Fig. 25 is a longitudinal section of a parti-tubular continuous strap-rail containing a continuous operating-rod.
Fig. 26 is a perspective of the parti-tubular continuous strap-rail.
Fig. 27 is a perspective of an external sleeve applied to the strap-rail.

In the construction shown in Figs. 15 and Figs. 25 to 28 inclusive, the strap-rail 39 is parti-tubular and the longitudinal slot or opening therein is shown arranged at its upper side. The hand-lever 35 here shown has its lower end cylindric to fit within the strap-rail, and while it may engage the operating-rod in the manner shown, for example, in Fig. 23, it is shown as having a flat-sided opening to receive the flat-sided operating-rod 19. The hand-lever will in this construction be inserted at the end of the slotted or parti-tubular strap-rail and slid along therein to its proper position. For the purpose of holding it opposite the bracket 29 an external sleeve 58 is provided, having an opening 59 wide enough transversely of said sleeve to admit the cylindric portion of the hand-lever, and desirably provided with a recess 60 at the bottom, in which the bracket 29 enters, as shown in Figs. 15 and 25, so that when the strap-rail is secured by a screw to the bracket, as indicated, said sleeve 58 will retain its position at the bracket and will hold the hand-lever in place. The longitudinal slot in the strap-rail gives room for the necessary vibration of the hand-lever, or, if not, this slot may be widened at the proper places for this purpose.

It has been explained that the pulley 18 (shown in Figs. 5 and 6) is of the character set forth in my prior patent, No. 480,732, in which it is combined with a helical spring for its retraction. This spring, though not shown in the present drawings, should be employed when the retracting-spring of the register is not of sufficient strength to retract the operating-rod.

It is evident from the illustrations and descriptions given of differing constructions that my invention may be widely modified in its details, and I wish it to be understood that I am not restricted to the forms of devices herein shown and described, but that other variations may be made without departure from my invention.

It is especially evident, for example, that in place of the pulley, which in the foregoing illustrations is connected by a strap or cord with the movable parts of the register, an arm may be attached to the operating-rod and that said arm may be connected with the movable mechanism of the register, either by a strap or a cord, according to the character of register mechanism.

It is also evident that when the rod connection referred to is employed, and proper full-motion-compelling mechanism is present in the register, such mechanism may be omitted from direct connection with the operating-rod.

It is also evident that the operating-rod may loosely fill the tubular or parti-tubular strap-rail and bear directly against the interior surface of the latter instead of being provided with intermediate or other supports, as shown, all within my general invention.

It is further evident that some of my improvements may be employed without others thereof and that the different forms of the various devices illustrated in the several constructions shown may be variously grouped in a single apparatus containing the invention.

I claim—

1. The combination with the sections of a register-operating rod, of couplings uniting the rod-sections, and hand-levers for rotating said rod engaging severally with the couplings.

2. The combination with a register-operating rod, and independently-operative hand-levers loosely mounted upon and adapted to engage with said rod, of a tubular strap-rail inclosing the said register-operating rod and provided with slots for passage of the said hand-levers, and means whereby the said levers are caused to engage with and operate the said rod, substantially as described.

3. The combination of a series of fixed brackets, a hollow strap-rail supported by said brackets and provided with slots at intervals, a register-operating rod arranged within the hollow strap-rail, a series of hand-levers loosely mounted upon and adapted to engage with said rod and projecting through the slots of the strap-rail, and means whereby the said levers are caused to engage with and operate the said rod, substantially as described.

4. The combination of a series of brackets, a hollow strap-rail formed in sections supported by and between said brackets, a register-operating rod inclosed in the hollow strap-rail and provided with series of lugs or projections, and a series of independently-operative hand-levers each provided with a lug or projection at the back of the lugs or projections on the register-operating rod, to engage therewith, whereby either lever may rotate the rod in one direction while the other levers remain stationary, substantially as described.

5. The combination of a series of brackets, a hollow and slotted strap-rail, a register-operating rod formed in sections and inclosed in said strap-rail, couplings connecting the sections of the register-operating rod and each provided with a lug or projection, and a series of hand-levers each provided with a lug or projection at the back of the lugs or projections on the said couplings, whereby the said levers are independently operative to move the register-operating rod in one direction while the other levers remain stationary, substantially as described.

6. The combination with a register-operating rod, and independently rocking or swinging hand-levers loosely mounted upon and adapted to engage with said rod, of a tubular strap-rail inclosing the register-operating rod and provided with slots for passage of the said hand-levers, and means whereby the said levers are caused to engage with and operate the said rod, substantially as described.

7. The combination of a series of fixed brackets, a hollow strap-rail supported by said brackets and provided with slots at intervals, a register-operating rod arranged within the hollow strap-rail, a series of rocking or swinging hand-levers loosely mounted upon and adapted to engage with said rod and projecting through the slots of the strap-rail, and means whereby the said levers are caused to engage with and operate the said rod, substantially as described.

JOHN W. MEAKER.

Witnesses:
JOHN L. JACKSON,
A. H. ADAMS.